United States Patent [19]

Matzkanin

[11] Patent Number: 4,622,951
[45] Date of Patent: Nov. 18, 1986

[54] SOLAR COLLECTOR ASSEMBLY AND KIT

[75] Inventor: Randy L. Matzkanin, Coral Gables, Fla.

[73] Assignee: Alternative Energy Resources, El Paso, Tex.

[21] Appl. No.: 738,354

[22] Filed: May 28, 1985

[51] Int. Cl.$^4$ ............................................... F24J 2/56
[52] U.S. Cl. ..................... 126/450; 126/434; 126/435; 126/437; 52/222
[58] Field of Search ............... 126/450, 417, 434–437, 126/448; 52/90, 222, 656; 160/354, 368, 380

[56] References Cited

U.S. PATENT DOCUMENTS

| | | | |
|---|---|---|---|
| 4,084,578 | 4/1978 | Ishibashi | 126/437 |
| 4,112,921 | 9/1978 | MacCracken | 126/450 |
| 4,189,880 | 2/1980 | Ballin | 52/222 |
| 4,340,030 | 7/1982 | Molivadas | 125/433 |
| 4,399,640 | 8/1983 | Porter | 52/222 |
| 4,453,585 | 6/1984 | Ruggeberg, Sr. et al. | 52/222 |

*Primary Examiner*—James C. Yeung
*Attorney, Agent, or Firm*—Fred A. Keire

[57] ABSTRACT

A solar collector water heater is provided in kit form suitable for installation by homeowner using a minimum of ordinary tools. The kit includes a rectangular insulation board serving as a baseboard, and a solar absorber plate mountable on the insulation board and including a heat exchanger with couplings for connection to a tank. A thermosiphon water tank is provided together with couplings for connecting to the heat exchanger. A main frame is assembled of a rear rail, a pair of side rails, and a front rail, all of extruded aluminum, using corner keys for adjoining adjacent ones of these rails at their ends. The rails include a generally cylindrical bead along their lengths. A front glazing panel and a pair of side glazing panels are provided with frames designed so that the side glazing panels are snap-fit mounted onto the side rails of the frame, and the front glazing panel is snap fit onto the front rail of the frame and onto the top rails of the side glazing panels. The frame members for the side glazing panels are extruded aluminum, with a generally cylindrical bead and a mating arcuate channel which snap fit with each other. The channels of the side panel rail members fit the beads of the main frame rails.

21 Claims, 4 Drawing Figures

SOLAR COLLECTOR ASSEMBLY AND KIT

The present invention is directed towards solar energy utilization, and is particularly directed to a passive solar water heating system which lends itself to easy assembly; more particularly this invention relates to a passive home solar water heating unit which is affordable due to its ease of assembly and installation and its expected long lasting working life.

BACKGROUND OF THE INVENTION

A passive solar water heating system does not have any moving parts or requires any pumping and piping assemblies which call for recirculation of the heat transfer fluid and the like. As a result, a passive solar water heating system is highly desirable if it can satisfy the requirements of a typical household user, such as in the Southwest United States and elsewhere in the United States where the available solar energy is capable of supplying almost all the heated water needs.

As it is well known, an active solar water heating system is a fairly expensive heating system and is only affordable because of the various tax credit incentives which have been provided for installation of these systems in a typical household. However, with the proposed elimination of these subsidies, the competitive advantage of a passive solar water heating system is clearly evident. Nevertheless, a passive solar water heating system has not been available which would be readily assembled and readily useful for a number of households, such as for the Southwest United States. Because of the fairly expensive installation techniques, these assemblies have been prohibitive to the economically less well positioned population.

BRIEF DESCRIPTION OF THE INVENTION

The present passive solar heating system, such as for heating household water, is affordable to a greater number of households. This solar water heating unit is easy to install. It is a supplemental heating system for a typical household, and it is affordable because of the ease of assembly and installation, at the same time having an expected long working life. All of the parts of the units are packaged in a manner such that a single person or at most two persons can handle the entire unit, and the dimensions of the containers for these units are such that these may be easily shipped or transported by homeowners. This advantage then makes the present unit affordable for a number of households which heretofore could not afford the solar water heating units. These water heating units, depending on the particular climate and location in which these units may be used, may supply either entirely the entire household hot water requirements or augment these requirements to such a degree that the savings over a fairly short period of time are manifested to the household, taking into account the capital investment and the savings in fuel costs and the like.

Consequently, the present unit is especially suitable for installation with the parts being assembled by the homeowner in a suitable location on the ground and then being carried onto the roof for final assembly. These assembly steps make it especially advantageous for a homeowner to realize the benefits of solar heating without the disadvantages heretofore encountered with the conventional active solar heating units.

Thus making available to a greater population a solar heating unit in the form in which it can readily be assembled and installed has been a desideratum in the solar heating field. The present unit accomplishes this objective.

Thus, it is an object of this invention to provide a passive solar water heating device which can be purchased in kit form and installed by consumer without unusual difficulty. It is another object of this invention to provide a passive solar water heating arrangement which is simple and reliable, and which, after installation, is highly efficient, dependable, and does not require significant maintenance.

It is a more particular object of this invention to provide the solar water heating system in a kit form wherein the parts are lightweight and of modular design, and can be snap fit together using only a minimum number of household tools and of a weight capable of being handled by one or at most two people.

According to an aspect of this invention, the solar collector water heater is formed of parts suitable for installation by a homeowner, and comprises a rectangular insulation board serving as a base or backboard, a solar absorber plate to be mounted on the insulation board, and including a heat exchanger at one end thereof with couplings for connection to a tank; a water tank having a main water inlet and a heated water outlet, as well as other inlets and outlets and connecting pipes for connecting to the couplings of the heat exchanger; a main frame assembly, which is to be assembled around the insulation board over which the solar absorber plate is mounted, including modular extruded aluminum front, rear, and side rails, with corner keys for adjoining adjacent ones of these rails at their ends to form the frame; a tank bed which is attached within the frame for securely mounting the tank; and at least one glazing panel formed of a sheet of transparent material such as Tedlar film (sold by DuPont) which is stretched onto the frame. Preferably, there are a front glazing panel and a pair of side glazing panels.

The front glazing panel frame is formed of rail members secured to one another to form a quadrilateral, with at least some of the rail members having integral snap-fit portions formed thereon for cooperating with mating structure on the rails of the main frame. This permits the glazing panel frame to be snap fit into the main frame over the absorber plate, forming a secure, weather proof assembly. Assembly takes place without requiring special tools. In a preferred embodiment, the mating structure of the main frame rails includes a generally circular-crosssection bead on an upper side of the rail, and the snap-fit portions of the glazing panel rail members include a groove of arcuate cross section into which the bead fits snugly. In the preferred embodiment, there are also side glazing panels with extruded aluminum rail extensions forming a frame and with a sheet of Tedlar stretched over the frame. The rail extension members have a generally cylindrical bead along their upper surface and a mating groove along their lower surface so that the side glazing panel can be snap-fit onto the main frame, and the main glazing panel can be snap fit to the side glazing panels.

In the preferred embodiment, the solar collector plate, with its associated heat exchanger, heats the water in the tank by the thermosiphon effect, so no moving parts are involved.

The solar collector water heater of this invention can be installed easily on any of a large variety of roofs without difficulty, and provides a secure, water-tight seal, between the outside environment and the inside of the structure on which the solar water heater is mounted.

DETAILED DESCRIPTION OF THE INVENTION

The above and many other objects, features, and advantages of this invention will be more fully understood from the following detailed description of a preferred embodiment, which is to be considered in connection with the accompanying drawings, wherein FIG. 1 is an exploded view of a solar collector water heater assembly, according to one preferred embodiment of this invention;

Figure 1:
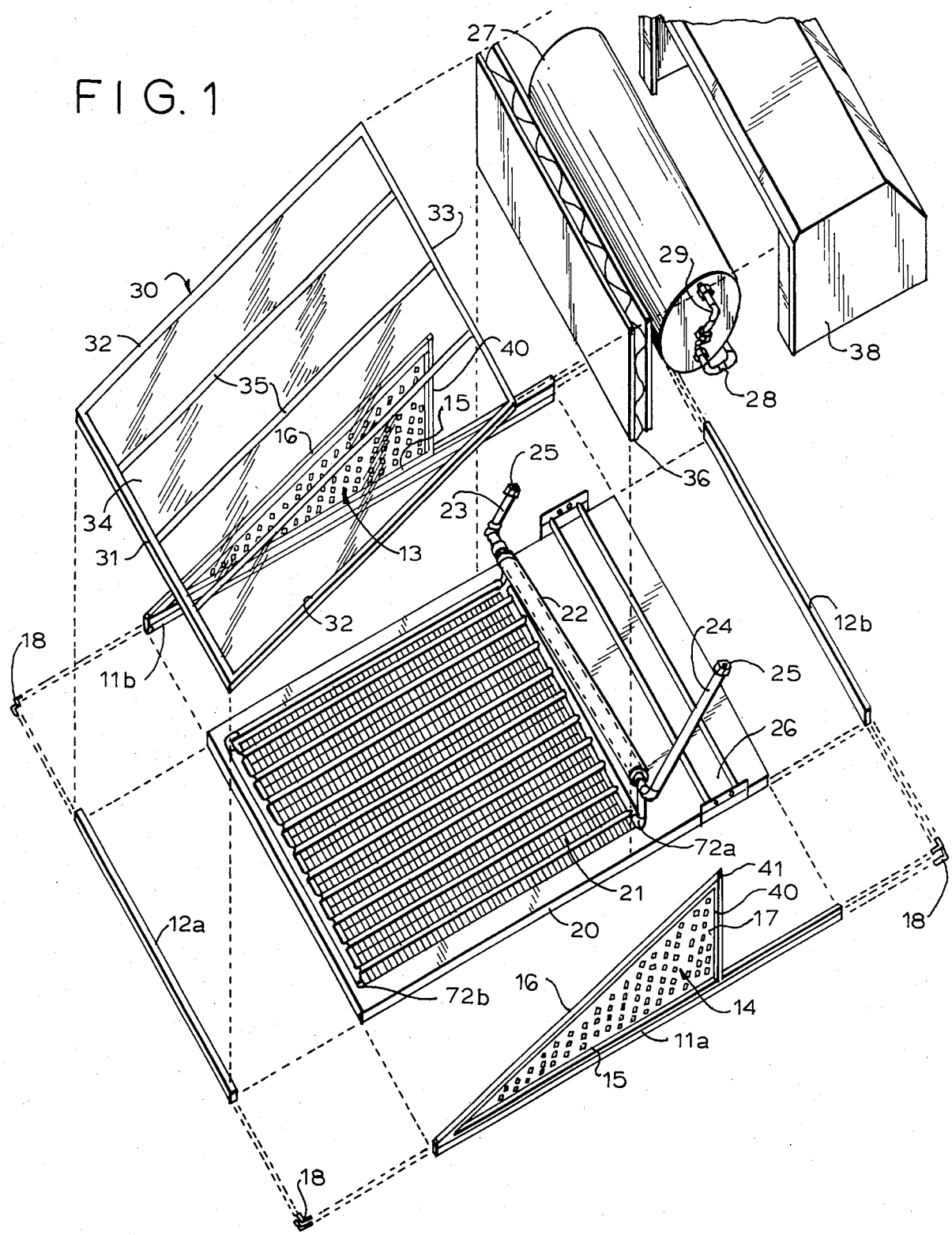

With reference to the drawings, and initially to FIG. 1 thereof, a solar collector assembly is formed of a pair of modular side rails 11a, 11b, and a modular front rail 12a and a modular rear rail 12b, each of which have generally similar structure as discussed later in connection with FIG. 2.

A left side glazing panel 13 and a right side glazing panel 14 are each formed of a lower rail extension 15 and an upper rail extension 16, with a Tedlar or other suitable generally solar radiant heat transparent film 17 being stretched over the frame formed by the rail extensions 15 and 16.

L-shaped corner keys 18 fit into mating structure at the ends of the main frame rails 11a, 11b, 12a, 12b, so that the latter form a generally rectangular quadrilateral frame. Spring clips (not shown) on the keys 18 secure them to the frame.

An insulating backboard 20 serves as a base on which is mounted a solar collector absorber plate 21 (discussed later in detail with respect to FIG. 3).

The absorber plate 21 has a tube-in-tube type heat exchanger 22 mounted at the upper edge thereof, with inlet and outlet riser pipes 23 and 24 at its ends. Pipe unions 25 are provided at the upper ends of these riser pipes 23 and 24.

A tank bed 26 is formed of straps of L-shaped cross section extending between flanges, so that the tank bed 26 fits snugly onto the baseboard 20.

A main water tank 27, as an illustration is a twenty-nine gallon cylindrical tank. Tank 27 rests securely on the tank bed 26, and has pipes 28a and 28b, inlet and outlet, respectively to connect to a main water supply and to a home hot water system, as well as pipes 29a and 29b to connect to the unions 25 of the pipes 24 and 23, respectively.

A modular front glazing panel 30 consists of a frame that is formed of a front film rim 31, a pair of side film rims 32 and a rear film rim 33, with a film 34 of Tedlar or other suitable membrane being stretched over the frame 31, 32, 33. Support struts 35 (shown in cross section in FIG. 2A) are connected to the front and rear rims 31, 33, generally parallel to the side rims 32, and serve to support the film 34.

An end wall board 36, backed with fiberglass batt is fastened or spot welded onto shroud 38. The tank shroud 38, preferably formed of sheet steel lined with R26 insulation, provides a decorative and protective cover for the tank 27. The shroud 38 is open at the bottom side thereof, and has holes along its mouth permitting the shroud to be affixed by screws or the like to other members of the assembly, e.g. main frame rails 11a, 11b and 12b.

Risers 40 which connect the rear ends of the rail extensions 15 and 16 can have metal or wood flanges for fastening to the end wall board 36 by screws or the like.

Figures 2, 2A:
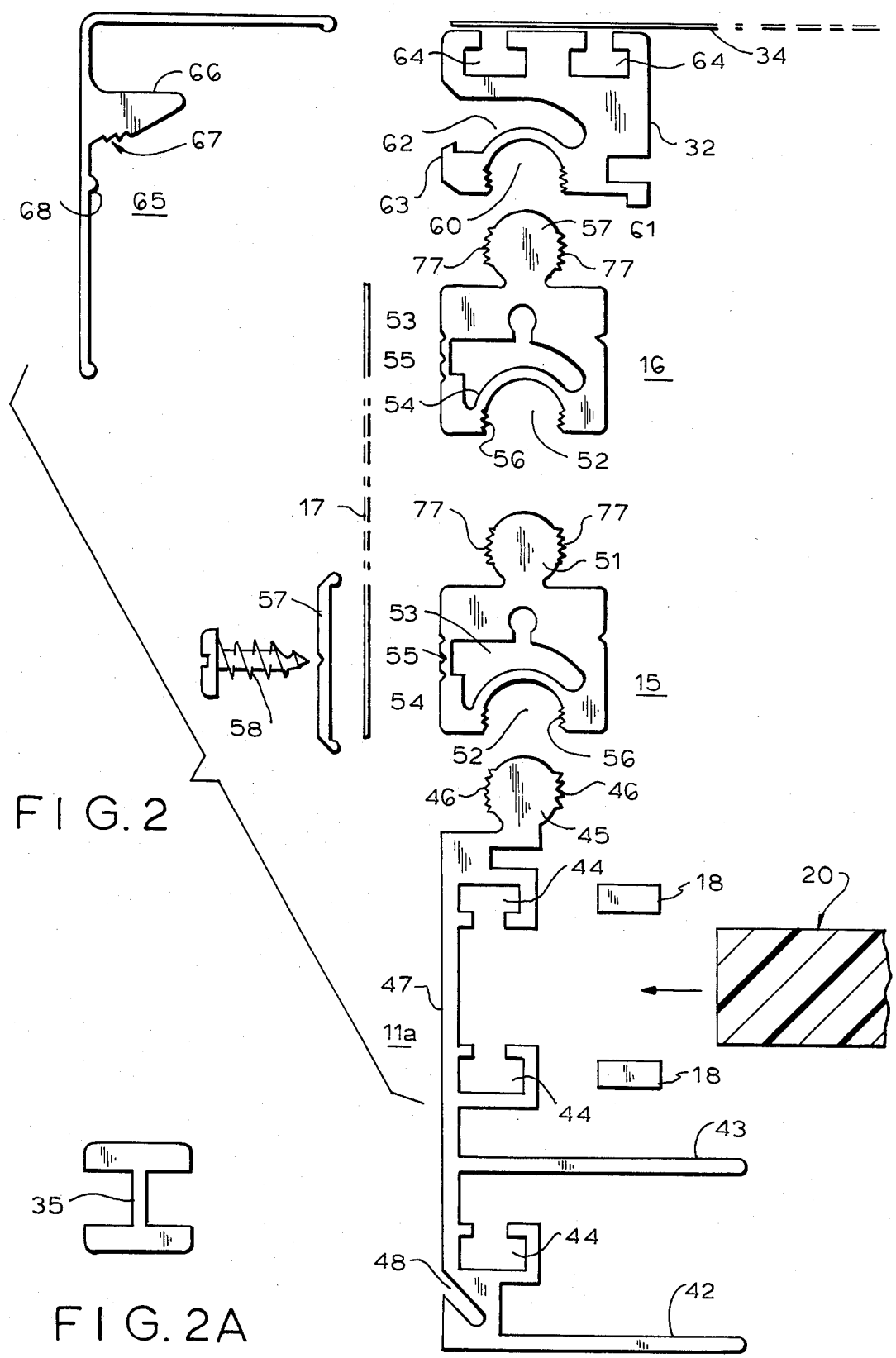
FIG. 2 is a cross sectional view of the modular assembly of the embodiment of FIG. 1.
FIG. 2A is a cross section of one of the other elements of the preferred embodiment of this invention.

The rail 11a of the main assembly frame, the rail extensions 15 and 16, and the film rim 32 are shown in cross section in FIG. 2. These elements are all formed of extruded aluminum for light weight and durability, and their novel construction, as illustrated in FIG. 2, also permits ease of assembly. Of course other suitable materials are suggested such as other metals or structural plastics, e.g. fiberglass reinforced plastics.

The main frame rails 11a, 11b (rails 12a and 12b being of similar construction) have spaced horizontal flanges 42 and 43, with the backboard 20 fitting above these flanges. Several keyways 44 are provided to fit the corner keys 18. A generally cylindrical bead 45, here shown as having a generally circular cross section, with fluting or teeth 46 at lateral portions thereof, is disposed at the top. A vertical web 47 extends from the flange 42 to the bead 45, and has an angled groove 48 at its foot for securing the rail 11a, 11b to a sleeper or to a roofer member (not shown).

The rail extensions 15 and 16 are extruded aluminum or aluminum alloy and have a cylindrical bead 51, of generally the same dimensions as the cylindrical bead 45, at an upper side thereof, and an arcuate groove or channel 52 at the bottom thereof. A cavity 53 formed in each of the rail extensions 15 and 16 has a lower arcuate surface extending generally parallel to the arcuate groove 52 and giving spring action to the latter. The cavity 53 also has a flat portion (at the left side in the drawings) for purposes to be described later.

Fluting or teeth 56, provided on the lateral portions of the groove 52, mate with the teeth 46 of the bead 45 so that the rail extension 15 can be snap-fit to, and held securely on the bead 45 of the corresponding main frame rail 11a. This structure also permits the rail extension 15 to be slid onto the rail 11a.

A side cap 57 is dimensioned to fit the side wall of the rail extension (15 or 16) and sandwiches the film 17 between the rail extension 15 and itself. A screw 58 screws through the sidewall of the rail extension 15 and fits into the cavity 53 to hold the side cap 57 to the rail extension 15.

The film rim 32 (film rims 31 and 33 being of similar construction) is extruded of aluminum and has in a bottom side thereof a generally cylindrically arcuate groove 60, of the same general dimensions as the groove 52 of the rail extensions 15 and 16, to be snap fit over either the bead 45 or the bead 51. The groove 60 has fluting or teeth 61, similar to those of the groove and channels 52, for interengagement with corresponding teeth 46 or 77 on the mating bead 45 or 51.

A cavity 62, open at an outer edge (at the left side of the drawing) has an arcuate lower surface generally coaxial with the groove 60 giving a spring action when assembling the film rim 32 onto the rail extension 16. An engaging pedestal 63 is situated at the open side of the cavity 62.

A film rim cap 65, generally L-shaped in cross section, and also extruded of aluminum, has a male member 66 which is insertable into the cavity 62 of the film rim 32. Teeth 67 are provided on a lower edge of the male member 66 to catch on the engaging pedestal 63 to hold the film rim cap 65 in place over the film rim 32 and the rail extension 16 with which the latter may be engaged. A bead 68 is provided just below the male portion 66, and the lower part 69 of the film cap 65 can be snapped off at this bead 68. The remaining portion of the film rim cap 65 (i.e., above the bead 68) can then be used in connection with the front film rim 31.

As shown in FIG. 2A, the struts 35 can be extruded of aluminum in H-shaped cross section.

The principles for heating the water in the tank 27 from heat developed in the solar collector plate 21 can be explained with reference to FIG. 3. In this view, parts discussed earlier are identified with the same reference numerals as in FIG. 1, and will not be described in detail.

The heat absorber plate 21 of this embodiment is formed for example of eleven fin tubes 70, which are filled, e.g., with a fluorocarbon heat transfer fluid, for example, having a boiling point of about 38° F. Greater or less number may be used depending on the size of the installation as it is contemplated that variously sized units may be demanded. Fins 71 extend laterally from these tubes 70, and are painted or coated with a selective absorber paint, so that the fins 71 absorb light of short wavelength, but do not as readily absorb or emit the longer infrared wavelengths. These paints are readily available. The tubes 71 extend between manifolds 72a and 72b, which in turn is connected by a riser tube 73 to the heat exchanger 22. The latter is a tube-in-tube heat exchanger having an outer tube 74 to which the heat transfer fluid is supplied from the riser tube 73, and a return tube 75 that connects to another manifold (not shown) for supplying the condensed refrigerant back to the tubes 70. An inner pipe 76 extends within the outer tube 74, and carries the tank water to be heated from the inlet pipe 23 to the outlet pipe 24.

Figure 3:
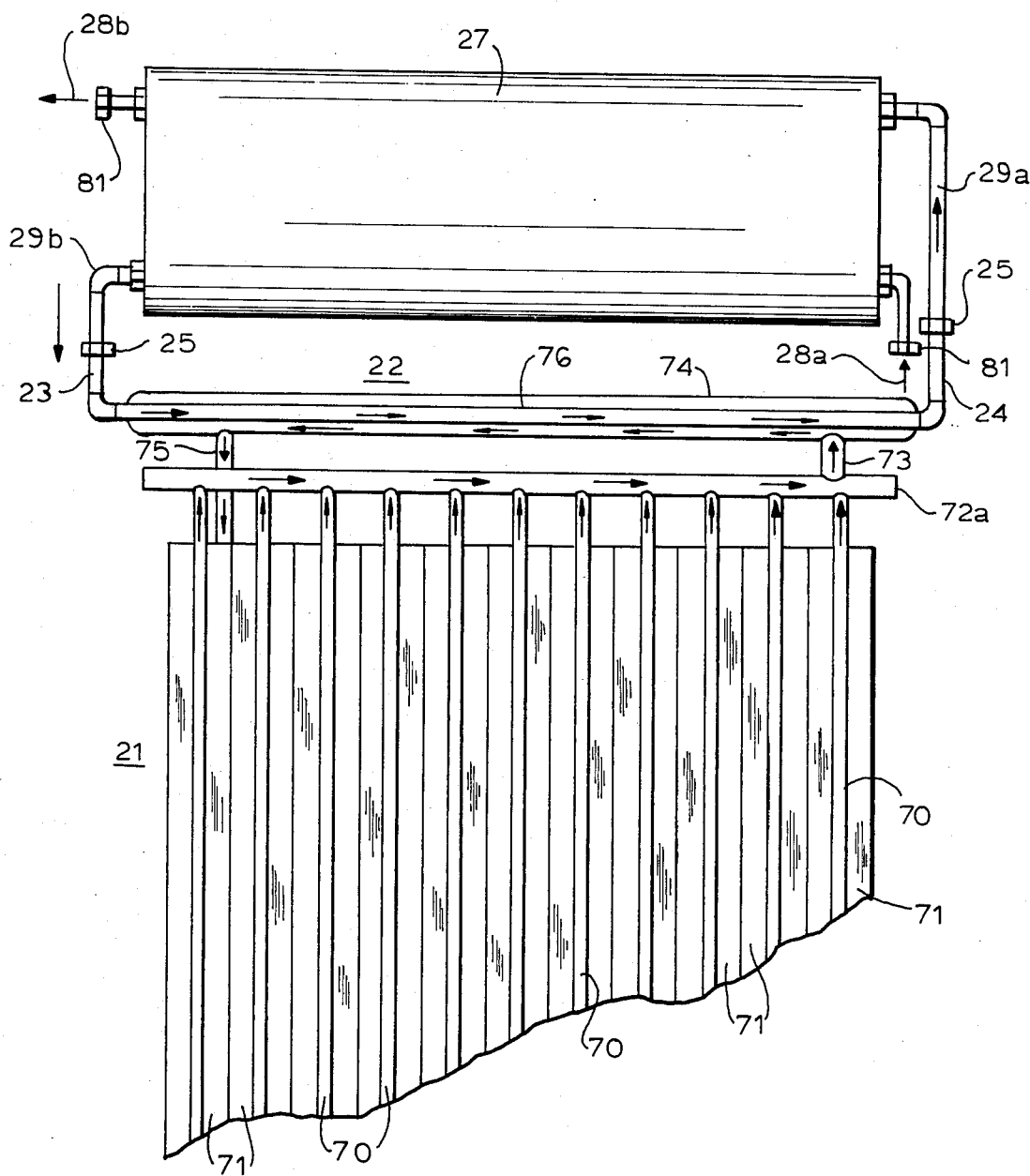
FIG. 3 is a general schematic illustrating the thermosiphon-effect operation of the solar water heater of this invention.

Generally, the absorber plate 21, the heat exchanger 22, and the tank 27 have the elevational relationships shown in FIG. 3, so that a thermosiphoning occurs through what is known as free convection.

Free convection or thermosiphoning circulation, comes about because of the varying densities of the fluids at different temperatures, and the force of gravity on them. As the water in the heat exchanger is heated, its density decreases, and this less dense, heated water rises through the pipes 24, 29a to the top of the tank 27, while the cooler denser water at the bottom of the tank 27 flows through the pipes 29b, 23 into the heat exchanger inner pipe 76. At the same time, solar radiation which impinges on the fins 71 of the solar collector absorber plate 21 heats the heat transfer fluid within the absorber tubes 70 and produces hot vapor. The latter proceeds through the manifold 72 and the riser pipe 73 to the annulus of the heat exchanger 22 between the outer pipe 74 and the inner pipe 76.

When these liquid-filled tubes 70 are exposed to sunlight, the liquid evaporates, and rises to the heat exchanger 22 as a gas. The heated gas surrounds the inner pipe 76 that is filled with the water flowing from the tank 27 and back into the tank. The water from the tank 27 is cooler than heat transfer fluid vapor, so the latter condenses and gives off its latent heat to the water. The water picks up the heat, rises in temperature, and then returns to the tank at the higher temperature, while the condensed heat transfer fluid returns through the return tube 75 to the absorber plate 21. This cycle repeats throughout the day, and accomplishes the heating of water in the tank 27 during the day. The thermosiphon effect will stop when either the water temperature is heated to the temperature of the refrigerant, or when, owing to a lack of sunlight, the refrigerant gas becomes as cool as the water.

In order to effect proper circulation of the refrigerant, the heat exchanger 22 is approximately two inches higher at the water outlet end (i.e., riser pipe 24) than at the inlet end (riser pipe 23).

The tube-in-tube heat exchanger 22 is favorably of the type known as the leak detector double augmented tube (LDDA tube) type heat exchanger available from Noranda Metal Industries, Inc., Newtown, Connecticut. The outer pipe 74 is a copper pipe. The LDDA tube is grooved on the inside surface in a circular pattern, and the outer surface of the inside pipe 76 is favorably a knurlled copper pipe. The knurlling on the inner pipe 76 resembles tiny dimples and serves the dual purposes of increasing the surface area available for heat exchange, and of creating turbulence in the functional environment.

In the manufacture of the glazing panels 13, 14, 30 of the kit, the extruded aluminum rails 15, 16, 40 or 31, 32, 33 are cut to appropriate lengths, and the ends are mitered and the parts are keyed or welded together. The metal is prepared for glazing such as by etching or cleaning, and is then glazed with the Tedlar membrane. The glazing membrane is mounted onto the aluminum frames using a double-sided adhesive tape (not shown). Once the membrane or film is mounted, the frame is placed into a high-temperature oven for about ten minutes, for heat shrinking. After the glazing panel has been removed from the oven, as the film cools it will shrink and gradually pull itself taut.

The various parts of the absorber plate are connected together by brazing and soldering and by connecting the various pipes and unions, but this is performed during manufacturing but not in the assembly.

The various parts including the glazing panel assemblies 13, 14, 30 the rails 11a, 11b, 12a, 12b, the tank 27, the shroud 38, and the solar collector absorber plate and heat exchanger assembly 20, 21 can be packaged and sold as a kit to the homeowner or other consumer, who can then install the assembly on his own roof in a few hours.

At the beginning of an installation process, sleepers (not shown), which can be clear redwood or treated pine two-by-eight boards, suitably weatherproofed, are attached to the desired location on the building roof. These serve as a secure surface onto which the frame 11a, 11b, 12a, 12b can be attached, and distribute the weight of the completely filled solar collector water heater over a large roof area. A bed of plastic roof cement should be applied to the sleeper prior to its final fastening to the roof.

Supply and return piping should be run from a point in the water system in advance of the main home water heater to supply cold water to the tank 27, and to supply the solar heated water from the tank 27 to the water heater. The supply and return piping should be routed as closely as possible to the bottom of the collector so that the roof penetrations will be covered by the collector.

It is recommended that the components be carried to the roof individually to reduce the hoisted weight.

Once the roof-top preparations have been made, the preassembled frame can be carried to the roof and positioned over the stubbed pipe penetrating the roof. The frame should be assembled first by connecting the rails 11a, 11b, and 12b using the L-shaped corner keys 18, leaving the front rail 12a off for the time being. Then, the backboard insulation piece can be slid in between the flanges 42 and 43 of the rails 11a, 11b. At this time the front rail 11a is positioned and attached, and the tank bed 26 is fitted in. The absorber plate 21 is the placed over the insulation 20 and connected to the tank 27. After the tank 27 has been positioned it is strapped in place by using the straps and buckles (not shown) provided in the kit.

After the tank 27 is installed into the bed 26, the plumbing connections are connected to the appropriate pipes. The unions 25 are used to connect the pipes 23, 24 from the heat exchanger 22 to the inlet 29a and outlet pipes 29b of the tank 27. The male unions are sweat soldered to the pipe stubs penetrating the roof. If the tank and the penetrating pipe stubs are of two different metals, a dielectric union can be employed to prevent electrolytic deterioration.

The side panels 13 and 14 are snapped into position on the frame rails 11a and 11b. Next, loose fiberglass filler is distributed atop the collector plate 21 at the point where the end wall 36 can rest upon it and compress it. This serves as a heat block between the absorber plate 21 and the tank compartment to be formed by the shroud 38. Then, the front glazing panel 30 is snap-fit into place. Last, the insulated shroud 38 is placed over the tank and screwed into place using sheet metal screws or the equivalent.

Following this, the homeowner can check for leaks, either using an inert gas system, or by filling the system with water.

It is also recommended that a bypass valve be employed between the feed pipe and return pipe, that is, between the main water supply and the main household water heater. The by-pass valve can be a three-way valve actuable manually to open or close the pipes going up to the solar collector water heater and down into the main hot water heater. This permits maintenance to be carried out on the solar collector water heater by closing off the collector flow without completely disrupting the hot water system.

The embodiment described herein is designed to heat water for domestic use, and has an overall length of six feet and width of four feet, with the insulation backboard 20 being approximately one inch thick, the absorber plate being about four feet by four feet, and the tank 27 having a capacity of about twenty-nine gallons. However, it should be understood that the invention is certainly not limited to solar collector systems of this particular size and shape or capacity.

The preferred embodiment employs as the solar heat transfer fluid Refrigerant 114, developed by DuPont. However, other fluids are available and could be employed, if desired. Also, the Tedlar glazing, which is a PVF (polyvinylfluoride) film, could be replaced with another suitable material. However, this particular material is preferred in that a Tedlar film 4 mils thick provides a lightweight, shock resistant, and transparent glazing panel which can be stretched and shrunk to take on the look of glass, and is a fraction of the cost and weight of the glass.

The invention, of course, is not limited to the preferred embodiment, or to any of the modifications and variations discussed hereinabove. Many other modifications and variations would present themselves to those of skill in the art without departure from the scope and spirit of this invention as defined in the appended claims.

What is claimed is:

1. A method of installing a solar collector water heater comprising the steps of:
    assembling a main frame over a base board by sliding corner keys into ends of a pair of side rails and a pair of end rails, said base board having mounted thereon a solar absorber plate including a heat exchanger at one end of the absorber plate with couplings for connection to a tank;
    installing a water tank onto said frame, said tank having a make-up water inlet, a heated-water outlet, a tank-to-heat-exchanger coupling and a heat-exchanger-to-tank coupling;
    connecting said make-up water inlet to a source of water, said heated water outlet to an inlet of a hot water system, and said tank-to-heat-exchanger coupling and said heat-exchanger-to-tank coupling to the associated couplings of said heat exchanger;
    assembling onto said main frame at least one glazing panel formed of a panel frame and a sheet of transparent material stretched onto said panel frame, the latter including rail members secured to one another, at least some of the rail members having integral snap-fit structure thereon cooperating with mating structure formed integrally on at least some of the rails of the main frame, said assembling including sliding at least one rail member of said panel frame onto a corresponding rail of the main frame so that the snap-fit and mating structures interengage one another to hold said glazing panel securely in place over said absorber plate.

2. A method of installing a solar collector water heater comprising the steps of:
    assembling a main frame over a base board by sliding corner keys into ends of a pair of end rails and a pair of side rails, and said base board having mounted thereon a solar absorber plate including a heat exchanger at one end of the absorber plate with couplings for connection to a tank;
    installing a water tank onto said frame, said tank having a make-up water inlet, a heated water outlet, a tank-to-heat-exchanger coupling, and a heat-exchanger-to-tank coupling;
    connecting said make-up water inlet to a source of water, said heated water outlet to an inlet of a hot water system, and said tank-to-heat-exchanger coupling and said heat-exchanger-to-tank coupling to the associated couplings of said heat exchanger;
    mounting on each of said side rails a triangular side glazing panel including an upper rail member and a sheet of transparent material extending to the upper rail member from the corresponding side rail of the main frame;
    assembling onto said main frame and said side panels a glazing panel formed of a panel frame and a sheet of transparent material stretched over said panel frame, the latter side rail members and end rail members secured to one another to form a quadrilateral, with said side rail members having integral snap-fit structure thereon cooperating with mating structure integrally formed on the upper rail members of said side glazing panels, said assembling the glazing panel onto the main frame and side panels including sliding the side rail members onto the upper rail members of said side glazing panels so that the snap-fit and mating structures interengage one another to hold said glazing panel securely in place over said absorber plate.

3. A method of installing a solar collector water heater as in claim 2, further comprising fitting a shroud over said tank.

4. A method of installing a solar collector water heater as in claim 3, wherein said step of fitting the shroud includes installing a tank board between rear ends of the side glazing panels and said tank, and affixing said tank shroud to said tank board.

5. A solar collector water heater assembly comprising a rectangular insulation board serving as a base; a solar absorber plate mounted on said insulation board and including a heat exchanger with couplings for connection to a tank; a water tank having main water inlet and outlet means and means connected to the couplings of the heat exchanger; a main frame assembled onto the insulation board about the solar absorber plate including a front rail, a rear rail, side rails and cornerkeys joining adjacent ones of the rails at their ends to form corners of the frame; a tank bed attached within the frame and mounting said tank; and at least one glazing panel formed of a panel frame and a sheet of transparent material stretched onto the panel frame, the latter including rail members secured to one another with at least some of said rail members having integral snap fit means thereon cooperating with associated mating means of the rails of said main frame so that the glazing panel is snap fit onto the main frame and held securely in place by the interengagement of the snap fit means and the mating means.

6. A solar collector water heater assembly as in claim 5, wherein said main rails and said rail members are extruded aluminum.

7. A solar collector water heater assembly as in claim 6, wherein the mating means of the main frame rails include a generally circular cross section bead on an upper side of the rails, and said snap fit means include a channel of arcuate cross section snugly fitting over said bead.

8. A solar collector water heater assembly as in claim 7, wherein said rail members have a cavity formed therein with an arcuate surface generally coaxial with the arcuate cross section channel and providing spring action for said snap fit means.

9. A solar collector water heater assembly as in claim 7, wherein said beads and said grooves have interengaging fluting extending therealong at lateral portions of said beads and channels, for securely engaging one another when snap fit together.

10. A solar collector water heater assembly comprising a rectangular insulation board serving as a base; a solar absorber plate mounted on said insulation board and including a heat exchanger with couplings for connection to a tank; a water tank having main water inlet and outlet means and means connected to the couplings of the heat exchanger; a main frame assembled onto the insulation board about the solar absorber plate including a front rail, a rear rail, side rails and cornerkeys joining adjacent ones of the rails at their ends to form corners of the frame; a tank bed attached within the frame and mounting said tank; and at least one glazing panel formed of a panel frame and a sheet of transparent material stretched onto the panel frame, the latter including rail members secured to one another with at least some of said rail members having integral snap fit means thereon cooperating with assoicated mating means of the rails of said main frame so that the glazing panel is snap fit onto the main frame and held securely in place by the interengagement of the snap fit means and the mating means; said main rails and said rail members are extruded aluminum; the mating means of the main frame rails include a generally circular cross section bead on an upper side of the rails, and said snap fit means include a channel of arcuate cross section snugly fitting over said bead; said rail members have a cavity formed therein with an arcuate surface generally coaxial with the arcuate cross section channel and providing spring action for said snap fit means; said beads and said grooves have interengaging fluting extending therealong at lateral portions of said beads and channels, for securely engaging one another when snap fit together; further comprising at least one triangular side panel including a frame and a sheet of transparent material stretched over the side-panel frame, the latter including upper and lower rail members, each being formed with a bead of generally circular cross section for engaging the arcuate cross section channel of the glazing panel frame rail members and a channel of generally arcuate cross section for engaging the bead of the main frame rails.

11. A solar collector water heater assembly as in claim 10, wherein said side panel rail members are each formed of extruded aluminum and have a cavity formed therein with an arcuate surface generally coaxial with the arcuate cross section channel thereof.

12. A housing assembly for a solar collector water heater assembly of the type comprising a tank and a solar absorber plate, the housing assembly comprising
 a generally rectangular baseboard;
 a main frame assemblable onto said baseboard with said solar absorber plate mounted thereon including a front rail, a rear rail, side rails, and corner keys for joining adjacent ones of said rails at their ends to form corners of the frame,
 tank bed means attachable on said frame for mounting the tank; and
 at least one glazing panel for covering said solar absorber plate and formed of a frame and a sheet of transparent material stretched onto said frame, the frame including rail members secured to one another, at least some of the rail members having integral snap fit means thereon cooperating with associated mating means of the rails of the main frame so that the glazing panel frame can be snap fit onto the main frame over the absorber plate.

13. A housing assembly for a solar collector water heater assembly as in claim 12, wherein said main rails and said rail members are extruded aluminum.

14. A housing assembly for a solar collector water heater assembly as in claim 13, wherein the mating means of the main frame rails include a generally circular cross section bead on an upper side of the respective rail, and said snap fit means include a channel of arcuate cross section snugly fitting over said bead.

15. A housing assembly for a solar collector water heater assembly as in claim 14, wherein said rail members have a cavity formed therein with an arcuate surface generally coaxial with the arcuate channel, thus providing spring action for the snap fit means.

16. A housing assembly for a solar collector water heater assembly as in claim 15, wherein said beads and said channels have corresponding fluting extending therealong at lateral portions of said beads and channels for securely engaging one another when snap fit together.

17. A kit for construction of a solar collector water heater suitable for installation by a homeowner, comprising a rectangular insulation board serving as a base;

a solar absorber plate mountable on said insulation board and including a heat exchanger with couplings for connection to a tank;

a water tank having main water inlet and outlet means and means for connecting to the couplings of the heat exchanger;

a main frame assemblable onto said insulation board with said solar absorber plate mounted thereon including a front rail, a rear rail, side rails, and corner keys for joining adjacent ones of said rails at their ends to form corners of the frame;

a tank bed attachable onto said frame for mounting said tank;

at least one glazing panel formed of a frame and a sheet of transparent material stretched onto said frame, the frame including rail members secured to one another, at least some of the rail members having integral snap fit means thereon cooperating with associated mating means of the rails of said main frame so that the glazing panel frame can be snap fit onto the main frame over said absorber plate; and at least one triangular side panel including a frame, and a sheet of transparent material stretched over the side panel frame, the latter including upper and lower rail members, having integral snap fit means thereon cooperating with associated mating means of the rails of said main frame and said glazing panel.

18. A kit for construction of a solar collector water heater as in claim 17, wherein said main rails and said rail members are extruded aluminum.

19. A kit for construction of a solar collector water heater as in claim 18, wherein the mating means of the main frame rails include a generally circular cross section bead on an upper side of the respective rail, and said snap fit means include a channel of arcuate cross section snugly fitting over said bead.

20. A kit for construction of a solar collector water heater as in claim 19, wherein said rail members have a cavity formed therein with an arcuate surface generally coaxial with the arcuate channel, thus providing spring action for the snap fit means.

21. A kit for construction of a solar collector water heater as in claim 19, wherein said beads and said channels have corresponding fluting extending therealong at lateral portions of said beads and channels for securely engaging one another when snap fit together.

* * * * *